United States Patent [19]

Suzuki et al.

[11] 3,862,440

[45] Jan. 21, 1975

[54] PULSE TRANSFORMING CIRCUIT ARRANGEMENTS USING A CLOCK PULSE RESPONSIVE DELAYED INVERTER MEANS

[75] Inventors: Yasoji Suzuki, Kawasaki; Tomohisa Shigematsu, Yokohama, both of Japan

[73] Assignee: Tokyo Shibaura Electric Co., Ltd., Kawasaki-shi, Japan

[22] Filed: Sept. 11, 1973

[21] Appl. No.: 396,181

[30] Foreign Application Priority Data

Sept. 14, 1972 Japan .............................. 47-91672
Apr. 21, 1973 Japan .............................. 48-45432

[52] U.S. Cl. ................. 307/266, 307/268, 307/269, 328/58

[51] Int. Cl. .......................... H03k 1/18, H03k 5/04

[58] Field of Search ........... 307/214, 215, 260, 261, 307/266, 268, 269; 328/180, 13, 34, 35, 58

[56] References Cited

UNITED STATES PATENTS 3,737,673 6/1973 Suzuki .......................... 307/215 X

*Primary Examiner*—John Zazworsky
*Attorney, Agent, or Firm*—Flynn & Frishauf

[57] ABSTRACT

In a pulse transforming circuit arrangement for generating pulses responsive to the rise and/or fall of an input pulse signal, there is used a clock pulse responsive delayed inverting circuit which inverts the input signal at a point of time delayed from the level change of the input signal for a period corresponding to the width of the clock pulse, in accordance with the level of the clock pulse which changes in synchronization with the level change of the input signal. The clock pulse responsive delayed inverting circuit may be constituted by a clocked inverter. A NAND gate and/or a NOR gate generate pulses responding to the level variation of the input signal since the level of an output signal from the clocked inverter and the changed level of the input signal coincide with each other for a period corresponding to the width of the clock pulse.

14 Claims, 24 Drawing Figures

CLOCKED INVERTER

CLOCKED NAND GATE

CLOCKED NOR GATE

PULSE TRANSFORMING CIRCUIT ARRANGEMENTS USING A CLOCK PULSE RESPONSIVE DELAYED INVERTER MEANS

This invention relates to a circuit arrangement for generating a pulse responding to the level variation of an input pulse signal.

The prior art digital circuit includes a circuit for generating a pulse signal responding to the level variation of a particular digital input signal. This pulse signal generating circuit comprises a capacitor-bearing inverter for carrying out the inversion of the polarity of an output signal at a point of time delayed from the inversion of the polarity of the input signal; and a NAND or NOR gate supplied with an output signal from the inverter and the input signal so as to generate the above-mentioned pulse signal. As mentioned above, the prior art pulse transforming circuit includes a capacitor having a certain amount of capacitance to effect the aforesaid delay, and consequently has the drawback that in the case of integrated circuit version, the capacitor occupies a large space, unavoidably enlarging an integrated circuit. Though it may be considered advisable to provide a capacitor outside of the substrate of an integrated circuit in order to avoid the above-mentioned drawback, yet it is necessary to carry out the extra work of connecting the capacitor to the integrated circuit.

It is accordingly the object of this invention to provide a pulse transforming circuit arrangement eliminating the necessity of using a capacitor for the delayed inversion of the polarity of the pulse signal and in consequence adapted for integration.

SUMMARY OF THE INVENTION

According to an aspect of this invention, there is provided a pulse transforming circuit arrangement comprising a delayed inverting means for producing an output signal whose voltage level varies with a predetermined time delay from the level variation of an input signal and in the opposite direction to that of level variation of the input signal; and at least one logic gate means for producing an output pulse substantially responding to the level variation of the input signal by level coincidence of the varied level of the input signal with the output level of said delayed inverting means prior to input signal level variation, wherein said delayed inverting means is a clock pulse responsive delayed inverting means which receives at least one clock pulse the voltage level of which varies between first and second voltage levels and an input signal the voltage level of which varies in synchronization with the level variation of the clock pulse for keeping output voltage level unchanged from that which was attained prior to the level variation of the input signal by the first voltage level of the clock pulse during the first section of the period of the clock pulse following the level variation of the input signal and changing output voltage level by the second voltage level of the clock pulse during the second section of the period of the clock pulse.

DETAILED DESCRIPTION OF ILLUSTRATED EMBODIMENTS

Figure 1:
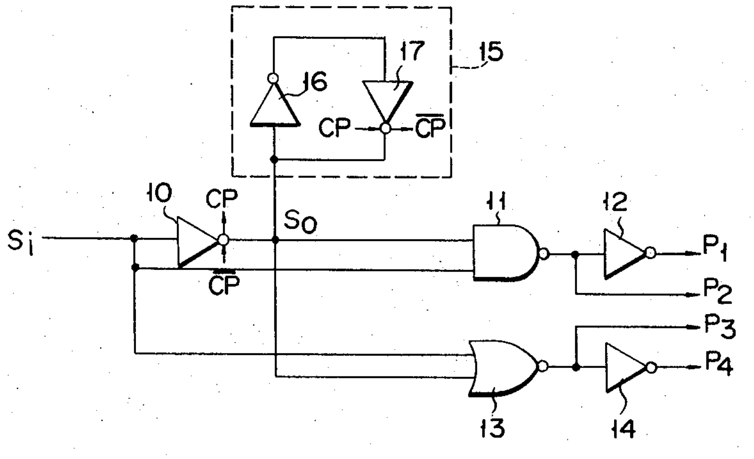
FIG. 1 shows the arrangement of a pulse transforming circuit according to a first embodiment of this invention.
Figure 2:
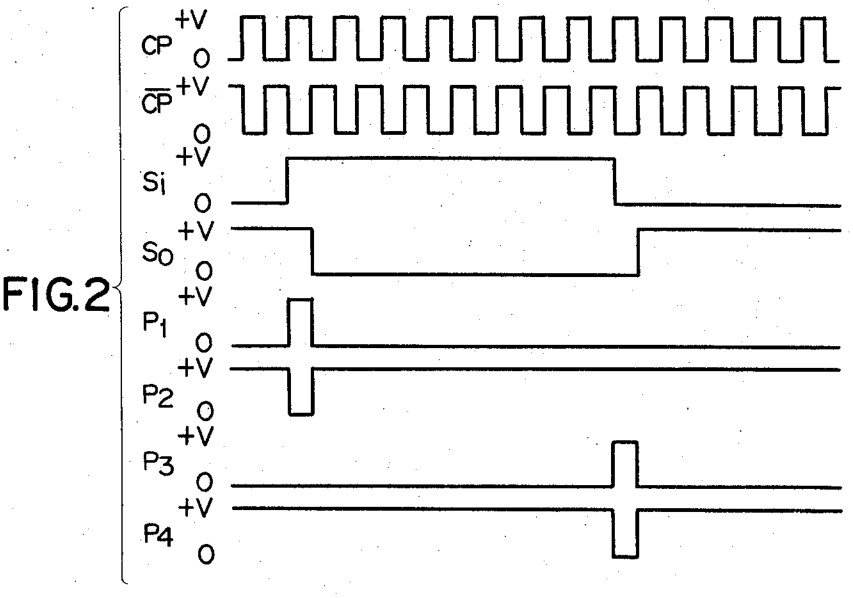
FIG. 2 represents waveforms by way of illustrating the operation of the embodiment of FIG. 1.

Referring to FIG. 1 showing a first embodiment of this invention, numeral 10 denotes a clocked inverter which consists of complementary insulated-gate field effect transistors and is repeatedly rendered operative and inoperative by the clock pulse signal CP and its complement $\overline{CP}$ shown in FIG. 2. The inverter 10 is supplied with an input signal $S_i$ whose level changes in synchronization with the rise of a clock pulse signal CP and generates an output signal $S_o$ whose level changes with a time delay corresponding to the width of the clock pulse signal CP. Accordingly, the input signal $S_i$ to the clocked inverter 10 and the output signal $S_o$ therefrom have the same level for a period corresponding to the width of the pulse signal CP.

The output signal $S_o$ from the clocked inverter 10 is conducted to the NAND gate 11 consisting of insulated-gate field effect transistors. The input signal $S_i$ is also directly supplied to the NAND gate 11. Thus, an output pulse signal $P_2$ having the same width as the clock pulse signal CP is generated from the NAND gate 11 in response to the rise of the input signal $S_i$. The output pulse signal $P_2$ is further supplied to an inverter 12 consisting of insulated-gate field effect transistors to generate a pulse signal $P_1$ having the opposite polarity to that of the pulse signal $P_2$. The input signal $S_i$ and the output signal $S_o$ from the clocked inverter 10 are further conducted to a NOR gate 13 consisting of insulated-gate field effect transistors to generate a pulse signal $P_3$ in response to the fall of the input signal $S_i$. The pulse signal $P_3$ is transmitted to an inverter 14 to produce a pulse signal $P_4$ having the opposite polarity to that of the pulse signal $P_3$.

Where required, a stabilization circuit 15 may be provided on the output side of the clocked inverter 10. The stabilization circuit consists of an inverter 16 and clocked inverter 17 connected in series. The input terminal of the inverter 16 is connected to the output terminal of the previously mentioned clocked inverter 10 and the output terminal of the clocked inverter 17 is connected to the input terminal of the inverter 16. The clocked inverter 17 included in the stabilization circuit 15 is repeatedly rendered operative and nonoperative by the clock pulse signal CP and its complement $\overline{CP}$, but in alternate relationship with the clocked inverter 10. The stabilization circuit 15 is intended to prevent the attenuation of charge in the output distributed capacitance of the clocked inverter 10 during the inoperative period of the clocked inverter 10, and should advisably be installed when the period of a clock pulse signal is relatively long.

There will now be described the circuits of inverters, clocked inverters and logic gates used with the pulse transforming circuit arrangement of FIG. 1, before the operation of the circuit is explained.

Figure 13:
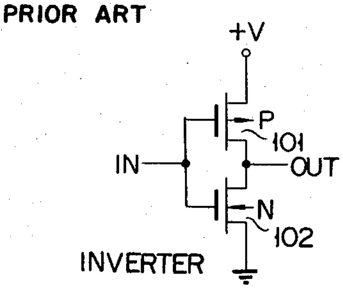
FIG. 13 PRIOR ART

FIG. 13 shows a complementary inverter of known type consisting of a P-channel insulated-gate field effect transistor 101 and N-channel insulated-gate field effect transistor 102 connected in series. When the gate electrodes of the transistors 101 and 102 are supplied with an input signal, then an output signal of the opposite polarity to the input signal is delivered from the junction of the channels of transistors 101 and 102.

Figure 14:
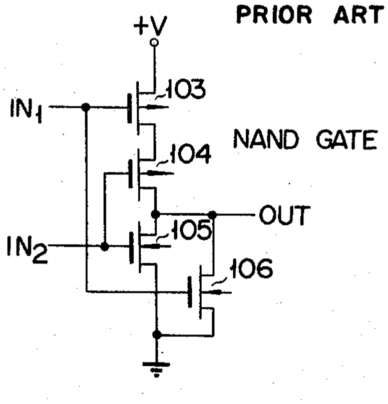
FIG. 14 PRIOR ART

FIG. 14 presents a NAND gate consisting of P-channel insulated-gate field effect transistors 103 and 104 and N-channel insulated-gate field effect transistors 105 and 106. The gate electrodes of the transistors 103 and 106 are supplied with a first logical input $In_1$, and the gate electrodes of the transistors 104 and 105 with a second logical input $In_2$.

Figure 15:
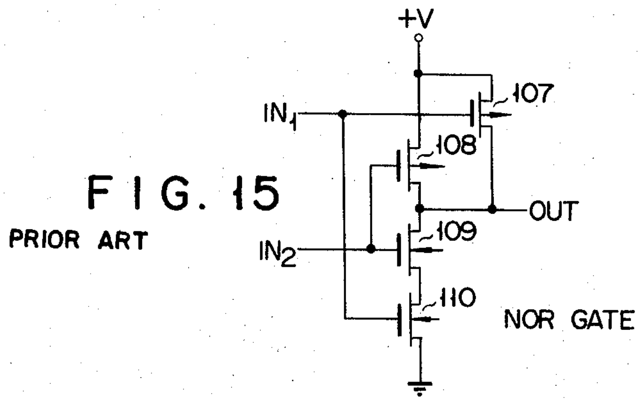

FIG. 15 is a circuit diagram of a NOR gate of known type consisting of P-channel transistors 107 and 108 and N-channel transistors 109 and 110. The gate electrodes of the transistors 107 and 110 are supplied with a first logical input $In_1$, and the gate electrodes of the transistors 108 and 109 with a second logical input $In_2$.

Figure 16A:
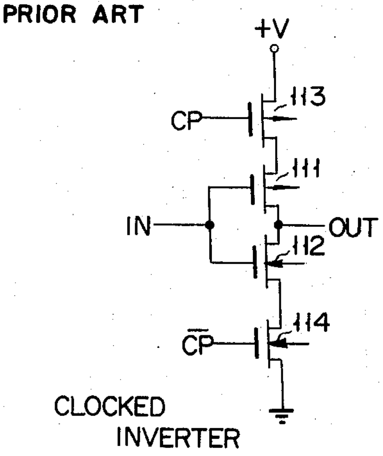
FIG. 16A PRIOR ART

FIG. 16A is a circuit diagram of a clocked inverter consisting of a P-channel transistor 111 and N-channel transistor 112 constituting an inverter, a P-channel transistor 113 whose gate electrode is supplied with a clock pulse signal CP and an N-channel transistor 114 whose gate electrode is impressed with a complementary clock pulse signal $\overline{CP}$. Where the clock pulse signal CP has a voltage of +V volts and consequently the complement $\overline{CP}$ has a voltage of zero, then the transistors 113 and 114 remain nonconducting, and in consequence the transistors 111 and 112 do not carry out inversion. Conversely, where the clock pulse CP has a voltage of zero-volt, and the complement $\overline{CP}$ has a voltage of +V volts, then the transistors 113 and 114 are rendered conducting, and the transistors 111 and 112 carry out inversion. If, in this case, an input signal has zero-volt, then the transistor 111 becomes conducting to cause an output capacitance (not shown) to be charged up to +V volts through the transistors 113 and 111. Conversely where an input signal has +V volts, then the transistor 112 is actuated, causing the output capacitance to be discharged down to zero through the transistors 112 and 114.

Figure 16B:
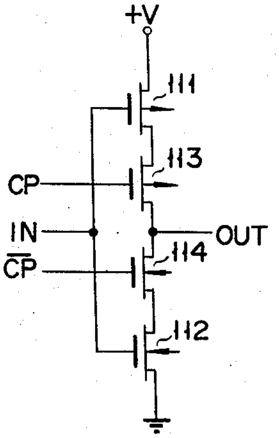
FIG. 16B PRIOR ART

In the arrangement of FIG. 16A, the inverting transistors 111 and 112 are sandwiched between the clocked transistors 113 and 114. However, the reverse may be permissible as shown in FIG. 16B.

There will now be detailed the operation of the pulse transforming circuit arrangement of FIG. 1. Where the input signal $S_i$ has its voltage raised from zero-volt to +V volts, then the clock pulse CP has its voltage similarly raised from zero-volt to +V volts. When, the clock pulse CP has +V volts and the complementary clock pulse signal $\overline{CP}$ has zero-volt, the clocked inverter 10 does not carry out inversion, causing an output signal $S_o$ to maintain the same voltage level of +V volts as that which prevailed prior to the level change of the input signal $S_i$. When the clock pulse signal CP falls to zero-volt and the complement $\overline{CP}$ rises to +V volts, then the clocked inverter 10 performs inversion, causing the output signal $S_o$ to fall to zero-volt. Thus, the input signal $S_i$ to the clocked inverter 10 and the output signal $S_o$ therefrom have the same voltage level of +V volts for a period corresponding to the width of the clock pulse signal CP. Obviously, therefore, the NAND gate 11 having its circuit arranged as shown in FIG. 14 and supplied with an input signal $S_i$ and output signal $S_o$ generates the negative going pulse $P_2$ of FIG. 2 responding to the rise of the input signal $S_i$. The negative going pulse signal $P_2$ is transformed into the positive going pulse $P_1$ by the inverter 12 whose circuit is arranged as shown in FIG. 13.

Also where the input signal $S_i$ has its voltage decreased from +V volts to zero-volt, the output signal $S_o$ has its voltage level changed at a point of time delayed from the level change of the input signal $S_i$ for a period corresponding to the width of the clock pulse signal CP. Obviously, therefore, the NOR gate 13 having its circuit arranged as shown in FIG. 15 and supplied with the input signal $S_i$ and output signal $S_o$ generates the positive going pulse signal $P_3$ responding to the fall of the input signal $S_i$. The positive going pulse signal $P_3$ is transformed into the negative going pulse signal $P_4$ by the inverter 14.

There will now be described the operation of the stabilization circuit 15. An output capacitance which has been charged up to, for example, +V volts during the operation of the clocked inverter 10 is sometimes discharged during the inoperative period of the clocked inverter 10, in case the clock pulse signal has a long period. The stabilization circuit 15 is provided to eliminate the danger of a false pulse signal nonresponsive to the fall of the input signal $S_i$ being generated from the NOR gate 13 due to the occurrence of the above-mentioned discharge. While the output signal $S_o$ maintains a voltage level of +V volts during the inoperative period of the clocked inverter 10, an output signal from the inverter 16 has its voltage level kept at zero-volt. The clocked inverter 17 of the stabilization circuit 15 is actuated while the clocked inverter 10 remains nonconducting and inverts the zero-volt output from the inverter 16 to +V volts, thereby preventing the attenuation of the output voltage level of the clocked inverter 10.

The alternate operation of the clocked inverter 17 included in the stabilization circuit 15 with the clocked inverter 10 can be effected simply by supplying the clock pulse signal $\overline{CP}$ to the gate electrode of the transistor 113 included in the clocked inverter of FIGS.

16A and 16B and the clock pulse CP to the gate electrode of the transistor 114 of the clocked inverter.

Figure 3:
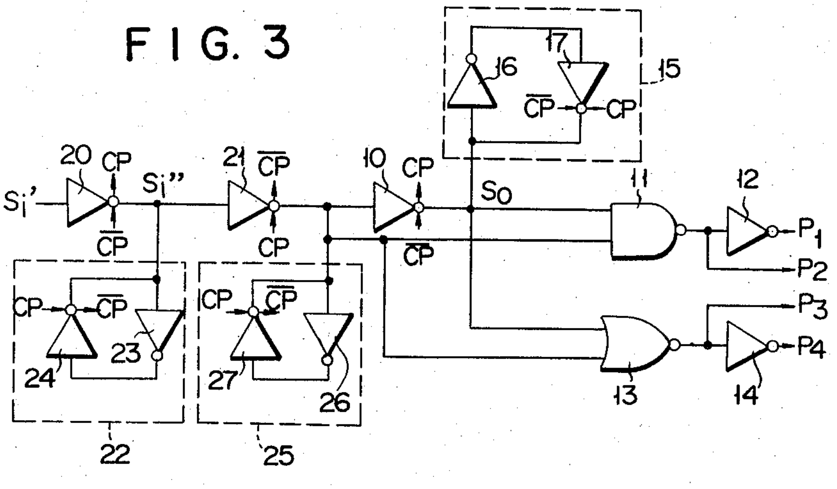
FIG. 3 indicates the arrangement of a pulse transforming circuit according to a second embodiment of the invention adapted to be used in the case where an input signal level does not vary in synchronization with a clock pulse.

FIG. 3 indicates the arrangement of a pulse transforming circuit according to a second embodiment of this invention adapted to be used in the case where the voltage level of an input signal $S_i'$ does not change in synchronization with the rise of a clock pulse signal CP. The parts of the second embodiment of FIG. 3 the same as those of FIG. 1 are denoted by the same numerals. In this second embodiment, the input signal $S_i'$ is supplied to a clocked inverter 20 which is rendered operative and inoperative for the same period as the clocked inverter 10. An output signal $S_i''$ is conducted to a clocked inverter 21 which becomes operative and inoperative alternately with the clocked inverter 10. An output signal $S_i$ from the clocked inverter 21 is transmitted to the clocked inverter 10. It is possible to provide on the output side of the clocked inverters 20 and 21 a second stabilization circuit 22 consisting of an inverter 23 and clocked inverter 24 and a third stabilization circuit 25 consisting of an inverter 26 and clocked inverter 27 to attain the same object for which the first stabilization circuit 15 is provided. In this case, the clocked inverter 24 of the second stabilization circuit 22 and the clocked inverter 27 of the third stabilization circuit 25 are designed to be rendered operative and inoperative alternately with the clocked inverters 20 and 21 respectively.

Figure 4:
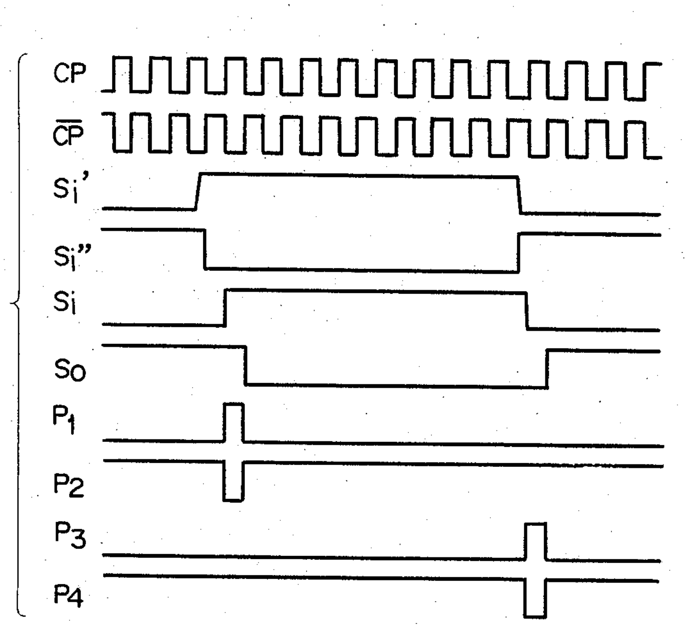
FIG. 4 is a waveform diagram illustrating the operation of the second embodiment of FIG. 3.

There will now be described by reference to the waveform diagram of FIG. 4 the operation of the second embodiment of FIG. 3. Where the input signal $S_i'$ has its voltage level increased from zero-volt to +V volts while the voltage of the clock pulse signal CP stands at +V volts, then the clocked inverter 20 does not carry out inversion, causing the output signal $S_i''$ to retain a voltage level of +V volts. When the voltage level of the clock pulse signal CP falls to zero-volt, then the clocked inverter 20 performs inversion, causing the voltage level of the output signal $S_i''$ to fall to zero-volt. Where the voltage level of the clock pulse signal CP stands at zero-volt, the clocked inverter 21 does not carry out inversion. Therefore, when the voltage level of the input signal $S_i''$ to the clocked inverter 21 stands at zero-volt, then the output signal $S_i$ similarly indicates a voltage level of zero-volt. When the clock pulse signal CP has its voltage level increased to +V volts, then the clocked inverter 21 commences operation to invert the voltage level of the input signal $S_i''$ to +V volts. As the result, the input signal $S_i$ to the clocked inverter 10 has its voltage level increased from zero-volt to +V volts in synchronization with the rise of the clock pulse CP, obtaining pulses $P_1$ and $P_2$ as in the first embodiment of FIG. 1. Similarly, the input signal $S_i$ to the clocked inverter 10 has its voltage reduced from +V volts to zero-volt in synchronization with the rise of the clock pulse CP, obtaining output pulses $P_3$ and $P_4$ as in the first embodiment of FIG. 1.

Figure 5:
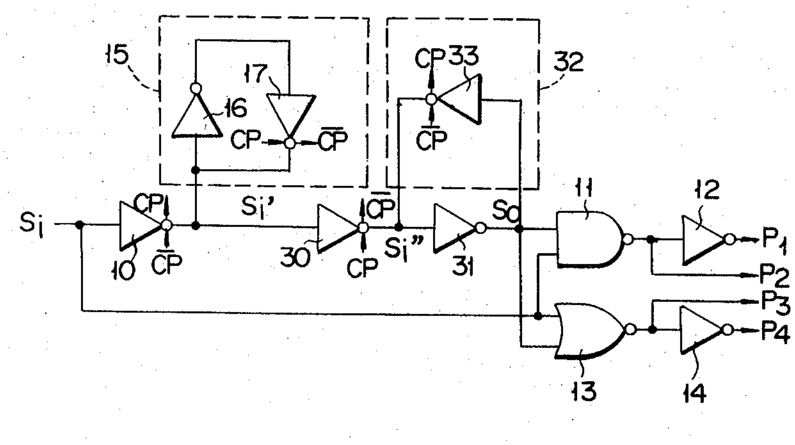
FIG. 5 shows a pulse transforming circuit arrangement according to a third embodiment of the invention which generates a pulse signal whose width is twice that of a clock pulse.

FIG. 5 denotes a third embodiment for generating a pulse whose width corresponds to the period of a clock pulse. The parts of the third embodiment of FIG. 5 the same as those of FIG. 1 are denoted by the same numerals. In this third embodiment, a clocked inverter 30 and inverter 31 are connected in series between the clocked inverter 10 on one hand and the NAND gate 11 and NOR gate 13 on the other. The clocked inverter 30 is designed to be rendered operative and inoperative alternately with the clocked inverter 10. The output terminal of the inverter 31 is connected to another clocked inverter 33 of a stabilization circuit 32, whose output terminal in turn is connected to the output terminal of the clocked inverter 30 so as to prevent the attenuation of the voltage level of the output of the clocked inverter 30. The stabilization circuit 32 or the clocked inverter 33 is designed to become operative and inoperative alternately with the clocked inverter 30.

Figure 6:
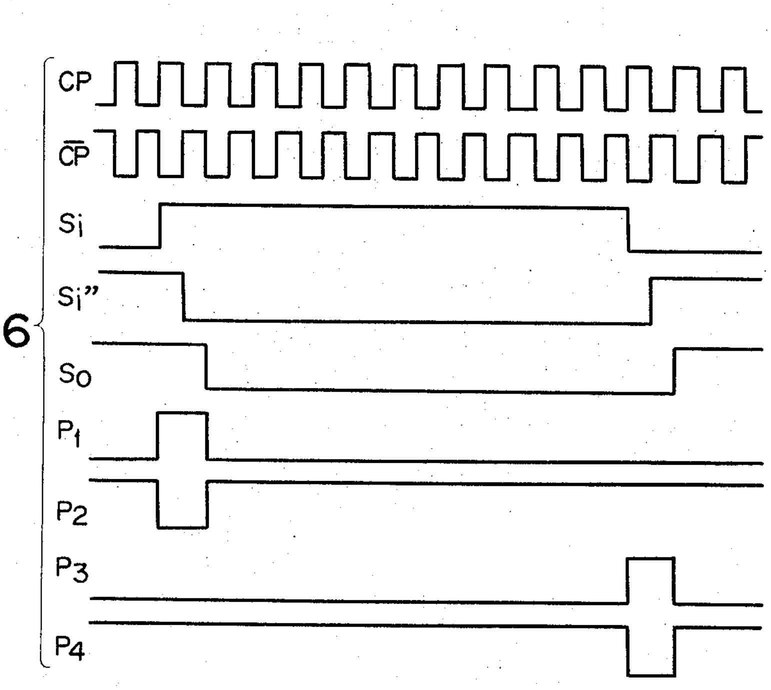
FIG. 6 is a waveform diagram indicating the operation of the third embodiment of FIG. 5.

There will now be described by reference to the waveform diagram of FIG. 6 the operation of the third embodiment of FIG. 5. An input signal $S_i$ whose level changes in synchronization with the level change of the clock pulse signal CP is inverted by the clocked inverter 10 with a time delay corresponding to the width of the clock pulse CP to generate an output signal $S_i'$. This output signal $S_i'$ is further inverted by the clocked inverter 30 with a time delay corresponding to the width of the clock pulse signal to provide an output signal $S_i''$. This output signal $S_i''$ is immediately inverted by the inverter 31 to produce an output signal $S_o$. Therefore, this output signal $S_o$ is the same as a signal obtained by inverting the input signal $S_i$ at a point of time delayed from the level change of the input signal $S_i$ as much as the period of the clock pulse signal. Accordingly, the input signal $S_i$ and the output signal $S_o$ from the inverter 31 are transformed by the inverter 12 and NAND gate 11 into output pulses $P_1$ and $P_2$ whose width corresponds to the period of the clock pulse signal. Further, the NOR gate 13 and inverter 14 generate output pulses $P_3$ and $P_4$ whose width corresponds to the period of the clock pulse signal.

In the third embodiment of FIG. 5, two-stage clocked inverters 10 and 30 were used to produce output pulses whose width corresponded to the period of the clock pulse. However, it is possible to use three or four-stage clocked inverters so as to obtain output pulses whose width corresponds to one and a half times or twice the period of the clock pulse.

Figure 7:
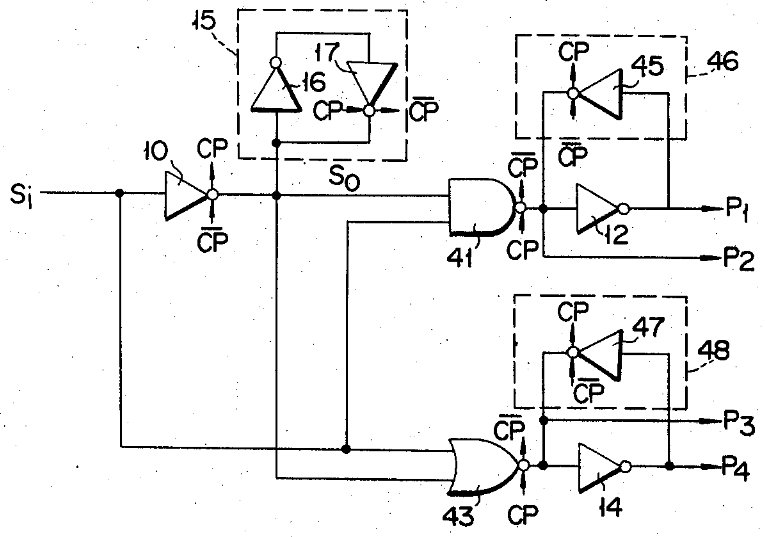
FIG. 7 represents a pulse transforming circuit arrangement according to a fourth embodiment of the invention which generates a pulse whose width is twice that of a clock pulse signal.

FIG. 7 represents a fourth embodiment of this invention for generating output pulses whose width corresponds, as in the third embodiment of FIG. 5, to the period of the clock pulse. In the fourth embodiment of FIG. 7, the NAND gate 11 and NOR gate 13 of FIG. 1 are replaced by a clocked NAND gate 41 and clocked NOR gate 43 respectively. It is possible to provide a stabilization circuit 46 consisting of a clocked inverter 45 which inverts an output signal from the inverter 12 to prevent the attenuation of the voltage level of the output of the clocked NAND gate 41. Further, another stabilization circuit 48 consisting of a clocked inverter 47 may be provided on the output side of the clocked NOR gate 43.

Figure 17A:
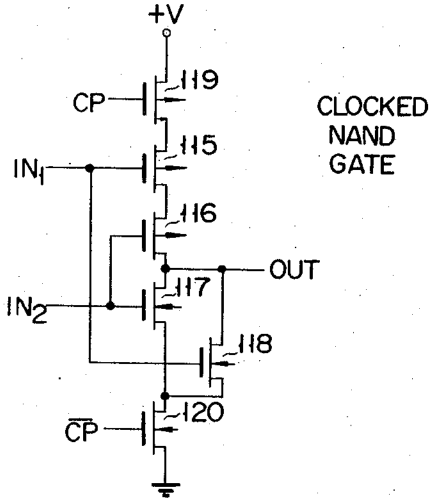
FIG. 17A PRIOR ART
FIGS. 13 to 21 are circuit diagrams of an inverter, clocked inverter, NAND gate, NOR gate, clocked NAND gate and clocked NOR gate usable in the aforesaid embodiments of the invention.
Figure 17B:
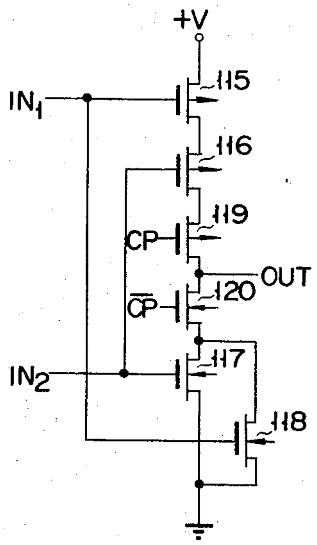
FIG. 17B PRIOR ART

The clocked NAND gate 41 and clocked NOR gate 43 are repeatedly rendered operative and inoperative by a clock pulse CP and its complement $\overline{CP}$. The clocked NAND gate 41 is formed, as shown in FIG. 17A, by sandwiching the same type of NAND gate as that of FIG. 14 consisting of insulated-gate field effect transistors 115 to 118 between clocked transistors 119 and 120 across a power source. Accordingly, when the clocked transistors 119 and 120 are rendered conducting, then the clocked NAND gate 41 acts as a NAND gate. When the clocked transistors 119 and 120 become inoperative, the clocked NAND gate 41 is not actuated. The clocked transistors 119 and 120 may be sandwiched between the logic transistors 115 to 118 as shown in FIG. 17B.

Figure 18A:
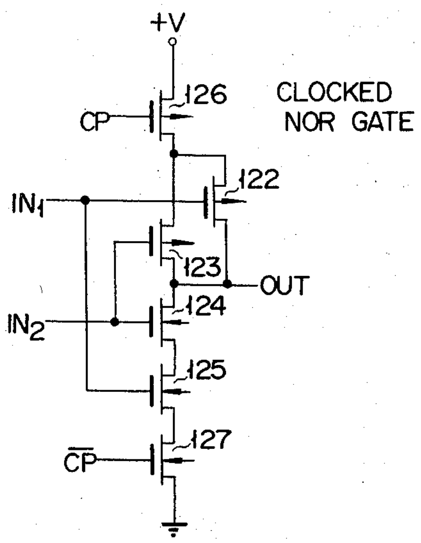
FIG. 18A PRIOR ART
Figure 18B:
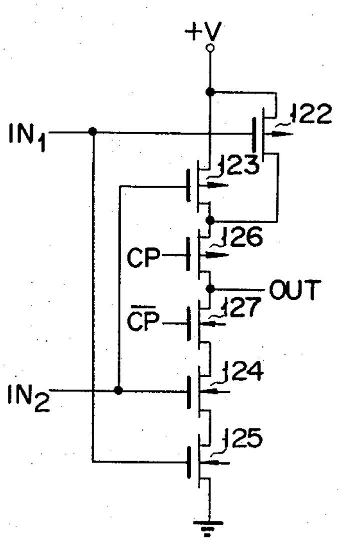
FIG. 18B PRIOR ART

The clocked NOR gate 43 is formed by sandwiching the same type of NOR gate as that of FIG. 15 consisting of insulated-gate field effect transistors 122 to 125 between clocked transistors 126 and 127 across a power source. When the clocked transistors 126 and 127 are rendered conducting, the clocked NOR gate acts as a NOR gate, and when the clocked transistors 126 and 127 become inoperative, the clocked NOR gate does not operate. The clocked transistors 126 and 127 may be sandwiched, as shown in FIG. 18B, between logic transistors 122 to 125.

Figure 8:
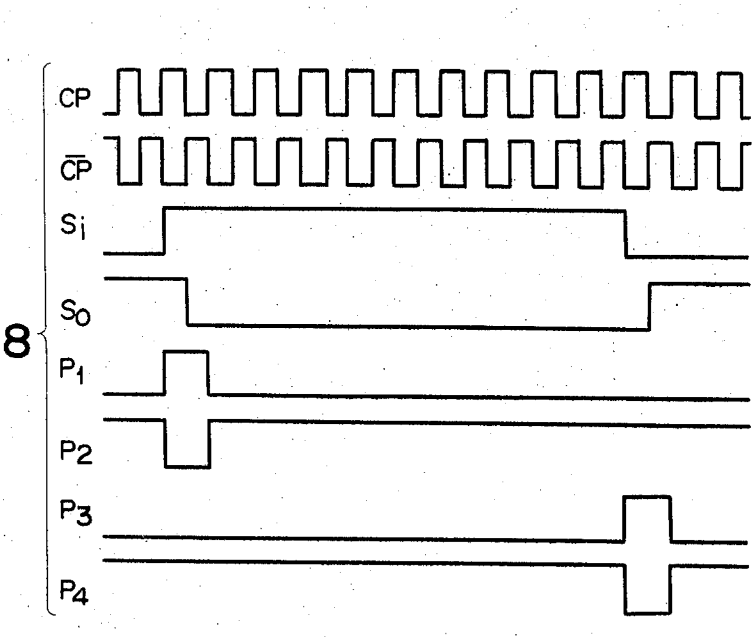
FIG. 8 is a waveform diagram showing the operation of the fourth embodiment of FIG. 7.

There will now be described by reference to the waveform diagram of FIG. 8 the operation of the fourth embodiment of FIG. 7. When an input signal $S_i$ rises in synchronization with the rise of a clock pulse signal CP, the clocked inverter 10 remains inoperative and in consequence an output signal $S_o$ has a voltage level of +V volts. Therefore, the clocked NAND gate 41 which is actuated when the clocked inverter 10 is not brought into operation generates an output signal having a voltage level of zero-volt. When the clock pulse signal CP falls, the clocked inverter 10 becomes operative to invert the voltage level of the input signal $S_i$ to zero-volt. Since, in this case, the clocked NAND gate 41 remains inoperative, the output maintains a voltage level of zero-volt. This voltage level of zero-volt continues until the clocked NAND gate 41 is brought into operation by the rise of the clock pulse CP. Accordingly, the clocked NAND gate 41 and inverter 12 generate a negative going pulse $P_2$ and a positive going pulse $P_1$ respectively, both having a width corresponding to the period of clock pulse. Similarly, at the fall of an input signal $S_i$, the clocked NOR gate 43 and inverter 14 produce pulses $P_3$ and $P_4$ both having a width corresponding to the period of clock pulse.

Figure 19:
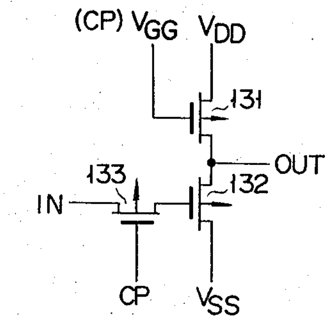
FIG. 19 PRIOR ART
Figure 20:
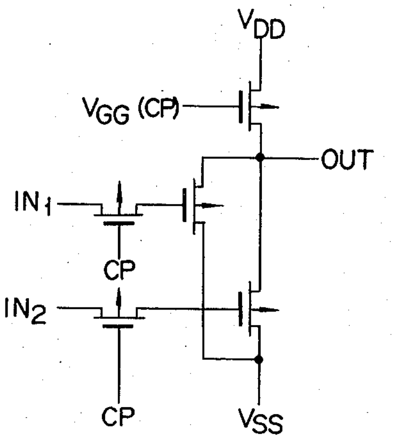
FIG. 20 PRIOR ART
Figure 21:
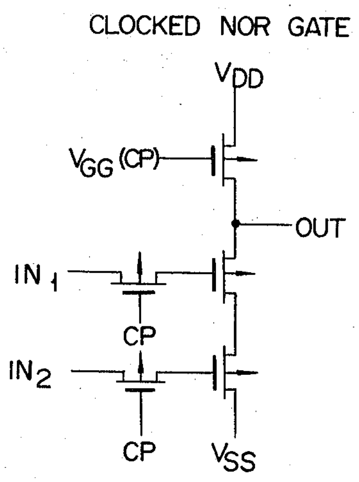
FIG. 21 PRIOR ART

The inverters, clocked inverters, logic gates and clocked logic gates used in the foregoing embodiments were described as including P- and N-channel transistors. Obviously, all these elements may only consist of P-channel or N-channel transistors. For example, FIG. 19 shows a clocked inverter consisting of P-channel transistors alone. Numeral 131 denotes a load transistor, 132 an inverting transistor, and 133 a clocked transistor for clocking an inverter consisting of transistors 131 and 132. The gate electrode of the load transistor 131 is supplied with a fixed voltage VGG or a clock pulse CP. For the P-channel transistor, the voltage VDD is chosen to have a higher level than the voltage VSS. FIG. 20 represents a clocked NAND gate consisting of P-channel transistors alone, and FIG. 21 a clocked NOR gate.

In all aforesaid embodiments, a clocked inverter was used as means for effecting the delayed inversion of the voltage level of an input signal. However, a shift register type may be used for this purpose. In the delayed inversion means 50 of FIG. 9, an input signal $S_i$ is supplied to an inverter 52 through a channel across the drain and source of a P-channel transistor 51. The output terminal of the inverter 52 is connected to one of the input terminals of the NAND gate 11 and NOR gate 13 respectively, and also to an inverter 54 through the channel of a P-channel transistor 53. The output terminal of the inverter 54 is connected to the input terminal of the inverter 52. The transistors 51 and 53 have the gate electrodes supplied with a clock pulse CP and its complement $\overline{CP}$ respectively so as to be rendered operative and inoperative alternately.

Figure 9:
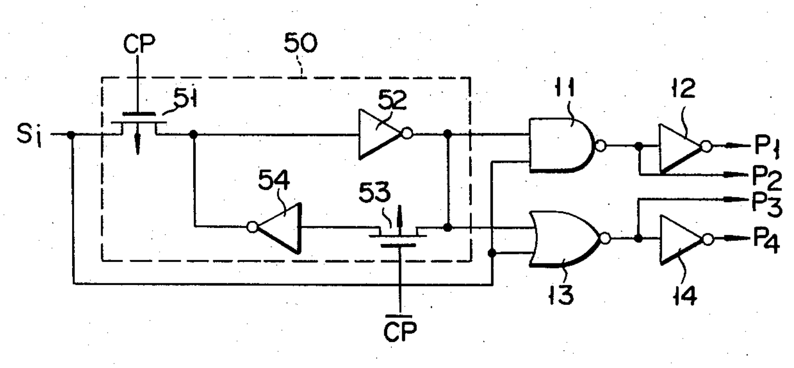
FIGS. 9 and 10 relate to other embodiments of the invention.

There will now be described the operation of a fifth embodiment of this invention shown in FIG. 9. According to this embodiment, even when an input signal $S_i$ rises in synchronization with the rise of a clock pulse CP, the transistor 51 remains nonconducting, preventing the level change of the input signal $S_i$ from being transmitted to the inverter 52. The transistor 51 becomes operative at the fall of the clock pulse CP, causing the voltage level of an output signal from the inverter 52 to fall. Namely, an output signal from the inverter 52 has its voltage level changed at a point of time delayed from the level change of the input signal $S_i$ for a period corresponding to the width of the clock pulse CP. At the rise of the clock pulse CP, the transistor 53 is rendered conducting, causing the voltage level of an output signal from the inverter 52 to be maintained through the inverters 54 and 52, in spite of the nonconducting state of the transistor 51. Therefore, the NAND gate 11 supplied with an input signal $S_i$ and an output signal from the inverter 52 generates, as in the preceding embodiments, a negative going pulse $P_2$ responding to the rise of the input signal $S_i$, and the inverter 12 provides a positive going pulse $P_1$. On the other hand, the NOR gate 13 and inverter 14 produce pulses $P_3$ and $P_4$ respectively responding to the fall of the input signal $S_i$.

Figure 10:
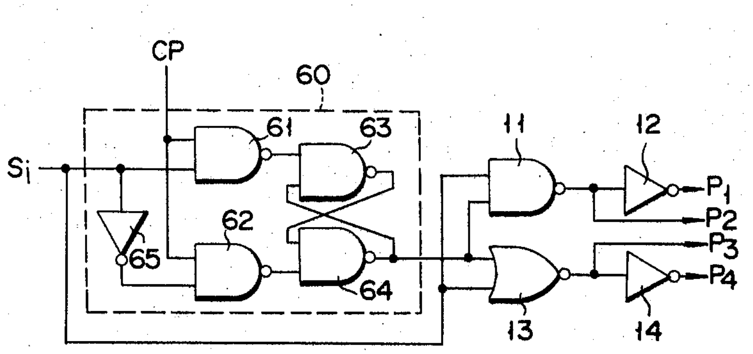

In the delayed inverting means 60 used in a sixth embodiment of this invention shown in FIG. 10, a clock pulse CP and input signal $S_i$ are conducted to a first NAND gate 61. The clock pulse CP and an output signal from an inverter 65 supplied with the input signal $S_i$ are delivered to a second NAND gate 62. An output signal from the first NAND gate 61 is supplied to one of the input terminals of a third NAND gate 63. An output signal from the second NAND gate 62 is transmitted to one of the input terminals of a fourth NAND gate 64. The output terminal of the third NAND gate 63 is connected to the other input terminal of the fourth NAND gate 64 and the output terminal of the fourth NAND gate 64 is connected to the other input terminal of the third NAND gate 63. Thus, the third and fourth NAND gates 63 and 64 are cross-coupled to form a bistable circuit. The output terminal of the fourth NAND gate 64 is connected to one of the input terminals of the NAND gate 11 and NOR gate 13 respectively.

There will now be described the operation of the sixth embodiment of this invention of FIG. 10. The moment an input signal $S_i$ rises in synchronization with the fall of a clock pulse CP, an output signal from the first NAND gate 61 maintains a high voltage level (+V volts), while an output signal from the second NAND gate 62 has its voltage level raised. Accordingly, an output signal from the third NAND gate 63 has its voltage level maintained at a low level (zero-volt), while an output signal from the fourth NAND gate 64 retains a high voltage level. At the rise of a clock pulse CP, an output signal from the first NAND gate 61 has its voltage level lowered, while an output signal from the second NAND gate 62 maintains a high voltage level. As the result, an output signal from the third NAND gate 63 has its voltage level raised, while an output signal from the fourth NAND gate 64 has its voltage level lowered. Thus, an input signal $S_i$ to the NAND gate 11 and an output signal from the fourth NAND gate 64 coincide with each other for a period corresponding to the fall of a clock pulse signal. Accordingly, the NAND gate 11 generates a negative going pulse $P_2$ and the inverter 12 a positive going pulse $P_1$. Further, the moment an input signal $S_i$ falls in synchronization with the fall of the clock pulse, the NOR gate 13 generates a positive going pulse $P_3$ and the inverter 14 a negative going pulse $P_4$.

Figure 11:
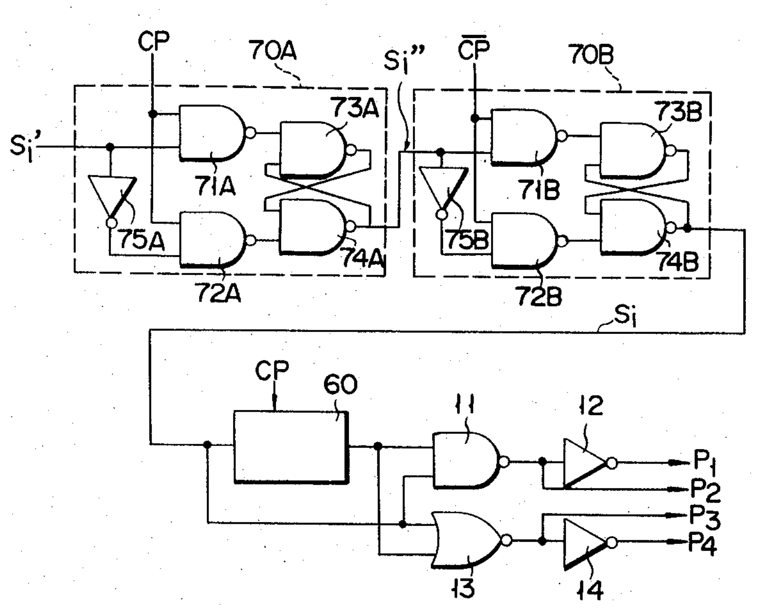
FIG. 11 represents still another embodiment in which a separate circuit is added to the embodiment of FIG. 10 so as to effect the forceful synchronization of an input signal and a clock pulse which happen to be non-synchronous.

The seventh embodiment of FIG. 11 is applied in the case where the rise and fall of an input signal $S_i$ supplied to the shift register type delayed inverting means 60 of FIG. 10 do not coincide with the fall of a clock pulse CP supplied to inverting means 60. In FIG. 11, two shift register type delayed inverting means 70A and 70B are provided to attain the synchronization of the rise and fall of the input signal $S_i$ supplied to the shift register 60 with the fall of the clock pulse CP delivered thereto. Like the delayed inverting means 60, the inverting means 70A consists of NAND gates 71A to 74A and inverter 75A, while the inverting means 70B is formed of NAND gates 71B to 74B and inverter 75B. The inverting means 70B is supplied with a complementary clock pulse $\overline{CP}$ to the clock pulse CP applied to the shift inverting means 70A.

Figure 12:
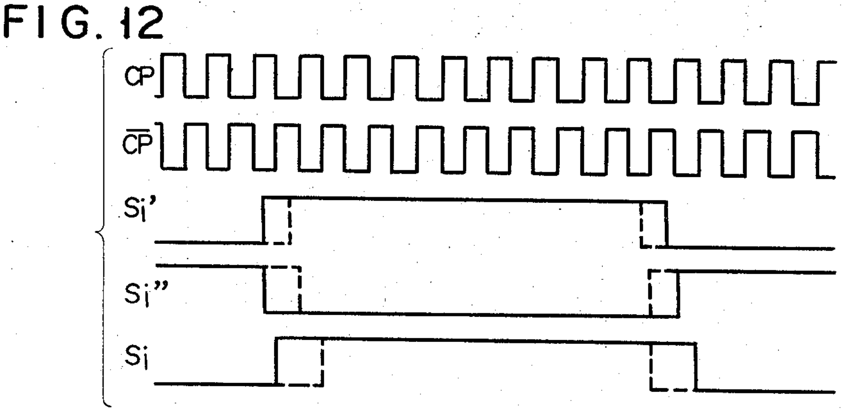
FIG. 12 is a waveform diagram showing the operation of the embodiment of FIG. 11.

The operation of the inverting means 70A and 70B provided for the above-mentioned synchronization will be easily understood from the description of the sixth embodiment of FIG. 10. When the first stage inverting means 70A is supplied with an input signal $S_i'$ shown in FIG. 12 whose voltage level changes independently of those of a clock pulse CP and its complement $\overline{CP}$, then an output signal $S_i''$ from the first stage inverting means 70A has its voltage level changed as illustrated in FIG. 12. The output signal $S_i''$ is transformed by the second stage inverting means 70B into a signal whose rise and fall fully synchronize with the fall of the clock pulse CP.

In the foregoing embodiments, an input signal was transformed into four output pulses responding to the rise and fall of the input signal. However, it is possible to transform the input signal into a pulse only responding to either the rise or fall of the input signal. If, in this case, it is unnecessary to invert the polarity of an output pulse from the logic gate of the NAND gate or NOR gate, then the inverter provided on the output side of the logic gate may be omitted. An output pulse from the pulse transforming circuit of this invention may be used, for example, as a clear pulse signal for a digital device.

The operations of the foregoing embodiments were explained in terms of positive logic. Accordingly, the NAND gate produces an output pulse responding to the rise of the input signal, while the NOR gate produces an output pulse responding to the fall of the input signal. However, it should be noted that where negative logic is used the NAND gate produces an output pulse responding to the fall of the input signal and the NOR gate an output pulse responding to the rise of the input signal.

What we claim is:

1. A pulse transforming circuit arrangement comprising:

a delayed inverting means for inverting an input pulse having a relatively long duration to produce an output pulse whose voltage level varies with a predetermined time delay from the level variation of the input pulse;

at least one logic gate means coupled to said delayed inverting means to receive the output pulse of said delayed inverting means and the input pulse for producing an output pulse which is substantially a function of the level variation of the input pulse and having a shorter duration than the input pulse; and a source of clock pulses;

said delayed inverting means comprising a first clock pulse responsive delayed inverting means operative to invert an input pulse according to a voltage level of at least one clock pulse, which clock pulse varies between a first voltage level during a first section of a period thereof and a second voltage level during a second section of the period following the first section, the voltage level of the input pulse varying when the clock pulse varies from the second voltage level to the first voltage level, and said clock pulse responsive inverting means being operative as an inverter to invert the input pulse when the clock pulse is at the second voltage level.

2. A pulse transforming circuit arrangement according to claim 1, wherein said first clock pulse responsive delayed inverting means comprising a clocked inverter comprising a P- and an N-channel transistor constituting a complementary inverter; and P- and N-channel transistors having their gate electrodes supplied with first and second mutually complementary clock pulses, said clocked inverter being prevented from carrying out inversion of the input signal when the first clock pulse has the first voltage level and the second clock pulse signal has the second voltage level and effecting said inversion when the first clock pulse has the second voltage level and the second clock pulse signal has the first voltage level.

3. A pulse transforming circuit arrangement according to claim 1, wherein first clock pulse responsive delayed inverting means is a clocked inverter comprising a load transistor of one channel type; an inverting transistor of the same channel type as said load transistor; and a transistor of the same channel type as said load transistor having a gate electrode supplied with the clock pulse for coupling the input signal to said inverting transistor when the clock pulse has the second voltage level.

4. A pulse transforming circuit arrangement according to claim 1, wherein said first clock pulse responsive delayed inverting means comprises a first and a second inverter; a first transistor for coupling the input signal to the input of said first inverter through the channel of the first transistor; a second transistor for the output of the first inverter to the input of said second inverter through the channel of said second transistor; and means for coupling the output of said second inverter to the input of said first inverter, said first and second transistors having gate electrodes supplied with clock pulses so as to cause the channels of said transistors to be alternately rendered conducting.

5. A pulse transforming circuit arrangement according to claim 1, wherein said first clock pulse responsive delayed inverting means comprises a first NAND gate supplied with the clock pulse and input signal; an inverter supplied with the input signal; a second NAND gate supplied with the clock pulse and an output signal from said inverter; and a third and a fourth NAND gate each having one of the two input terminals supplied with an output signal from said first and second NAND gates respectively, the other input terminal and output terminal of said third and fourth NAND gates being crosscoupled to form a bistable circuit.

6. A pulse transforming circuit arrangement according to claim 2 further comprising means coupled to the output of said clocked inverter for preventing attenuation of output voltage level of said clocked inverter during an inoperative period thereof.

7. A pulse transforming circuit arrangement according to claim 1 further comprising synchronizing means for synchronizing the level variation of the input pulse to said first clock pulse responsive delayed inverting means with the level variation of the clock pulse, said synchronzing means including second and third clock pulse responsive delayed inverting means cascade-connected at the input side of said first clock pulse responsive delayed inverting means and receiving the input pulse, said second clock pulse responsive delayed inverting means being operative as an inverter concurrently with said first clock pulse responsive delayed inverting means; and said third clock pulse responsive delayed inverting means being operative as an inverter alternately with said first and second clock pulse responsive delayed inverting means.

8. A pulse transforming circuit arrangement according to claim 7, wherein the second and third clock pulse responsive delayed inverting means comprise clocked inverters, respectively.

9. A pulse transforming circuit arrangement according to claim 7, herein said second clock pulse responsive delayed inverting means comprises a first NAND gate supplied with a first clock pulse signal and input signal; a first inverter supplied with the input signal; a second NAND gate supplied with the first clock pulse signal and an output signal from said first inverter; and a third and a fourth NAND gate each having one of the two input terminals supplied with an output signal from said first and second NAND gates respectively, the other input terminal and output terminal of said third and fourth NAND gates being cross-coupled to comprise a first bistable circuit; and said third clock pulse responsive delayed inverting means comprises a fifth NAND gate supplied with a second clock pulse signal complementary to said first clock pulse and an output signal from said first bistable circuit; a second inverter supplied with the output signal from said first bistable circuit; a sixth NAND gate supplied with the second clock pulse and an output signal from said second inverter; and a seventh and an eighth NAND gate each having one of the two input terminals supplied with an output signal from said fifth and sixth NAND gates respectively, the other input terminal and output terminal of said seventh and eighth NAND gates being cross-coupled to form a second bistable circuit.

10. A pulse transforming circuit arrangement according to claim 8 further comprising first and second means respectively coupled to the outputs of said second and third clock pulse responsive delayed inverting means for preventing attenuation of output voltage levels of said first and second clock pulse responsive delayed inverting means during an inoperative period thereof.

11. A pulse transforming circuit arrangement according to claim 1 further comprising between said clock pulse responsive delayed inverting means and said logic gate cascade-connection of at least an inverting means and a second clock pulse responsive delayed inverting means which is operative as an inverter alternately with said first clock pulse responsive delayed inverting means to thereby obtain from said logic gate an output pulse whose duration is equal to or greater than the period of the clock pulse.

12. A pulse transforming circuit arrangement according to claim 11 further comprising means coupled to the output of said first clock pulse responsive delayed inverting means for preventing attenuation of output voltage level of said second clock pulse responsive delayed inverting means during an inoperative period thereof.

13. A pulse transforming circuit arrangement according to claim 1 wherein said logic gate comprises a clocked logic gate which is provided with at least one transistor having its gate electrode supplied with a clock pulse so as to be operative alternately with said first clock pulse responsive delayed inverting means to thereby obtain from said logic gate an output pulse whose duration is equal to the period of the clock pulse.

14. A pulse transforming circuit arrangement according to claim 13 further comprising means coupled to the output of said clocked type logic gate for preventing attenuation of the output voltage level of said clocked type logic gate during an inoperative period thereof.

* * * * *